United States Patent
Jiang et al.

(10) Patent No.: US 9,500,922 B2
(45) Date of Patent: Nov. 22, 2016

(54) ARRAY SUBSTRATE, LIQUID CRYSTAL DISPLAY PANEL AND DISPLAY DEVICE

(71) Applicants: BOE TECHNOLOGY GROUP CO., LTD., Beijing (CN);
(Continued)

(72) Inventors: Qinghua Jiang, Beijing (CN); Feng Qin, Beijing (CN);
(Continued)

(73) Assignees: BOE Technology Group Co., Ltd., Beijing (CN);
(Continued)

( * ) Notice: Subject to any disclaimer, the term of this patent is extended or adjusted under 35 U.S.C. 154(b) by 225 days.

(21) Appl. No.: 14/367,841

(22) PCT Filed: Dec. 5, 2013

(86) PCT No.: PCT/CN2013/088689
§ 371 (c)(1),
(2) Date: Jun. 20, 2014

(87) PCT Pub. No.: WO2015/039386
PCT Pub. Date: Mar. 26, 2015

(65) Prior Publication Data
US 2015/0092134 A1 Apr. 2, 2015

(30) Foreign Application Priority Data
Sep. 22, 2013 (CN) .......................... 2013 1 0432586

(51) Int. Cl.
*G02F 1/136* (2006.01)
*G02F 1/1362* (2006.01)

(52) U.S. Cl.
CPC ..... *G02F 1/136286* (2013.01); *G02F 1/13624* (2013.01)

(58) Field of Classification Search
CPC .......................... G02F 1/136286; G02F 1/136
(Continued)

(56) References Cited

U.S. PATENT DOCUMENTS

| | | | |
|---|---|---|---|
| 2001/0019391 A1* | 9/2001 | Kim | G02F 1/133707 349/139 |
| 2002/0018164 A1* | 2/2002 | Ko | G02F 1/133707 349/129 |
| 2011/0006975 A1 | 1/2011 | Nagashima et al. | |

FOREIGN PATENT DOCUMENTS

| CN | 101046943 A | 10/2007 |
|---|---|---|
| CN | 101324729 A | 12/2008 |

(Continued)

OTHER PUBLICATIONS

Jun. 24, 2014—International Search Report with Eng Tran.
(Continued)

*Primary Examiner* — Lucy Chien
(74) *Attorney, Agent, or Firm* — Banner & Witcoff, Ltd.

(57) ABSTRACT

An array substrate, a LCD panel and a display device are disclosed. The array substrate includes: a substrate, a plurality of pixels disposed on the substrate and defined by a plurality of gate lines and a plurality of data lines. A common electrode and a pixel electrode are disposed in each pixel region. Two pixels at adjacent rows in a same column form a pixel set. A first gate line and a second gate line are disposed between the two pixels of the pixel set. The data line is disposed on the same side of the two pixels. A first switch transistor and a third switch transistor are disposed in one pixel region of the pixel set and at least a second switch transistor is disposed in the other pixel region.

20 Claims, 7 Drawing Sheets

(71) Applicants: HEFEI BOE OPTOELECTRONICS TECHNOLOGY CO., LTD., Hefei, Anhui (CN)

(72) Inventors: Xiaohe Li, Beijing (CN); Xianjie Shao, Beijing (CN); Yong Liu, Beijing (CN)

(73) Assignees: Hefei BOE Optoelectronics Technology Co., Ltd., Hefei (CN)

(58) Field of Classification Search
USPC .................................................. 349/43, 46
See application file for complete search history.

(56) References Cited

FOREIGN PATENT DOCUMENTS

| | | |
|---|---|---|
| CN | 101354512 A | 1/2009 |
| CN | 202003648 U | 10/2011 |
| CN | 102254917 A | 11/2011 |
| CN | 102566173 A | 7/2012 |
| CN | 102566183 A | 7/2012 |
| CN | 102629055 A | 8/2012 |
| CN | 102915716 A | 2/2013 |
| CN | 102981333 A | 3/2013 |
| CN | 103472647 A | 12/2013 |
| CN | 203480183 U | 3/2014 |
| JP | 02118522 A | 5/1990 |
| JP | 2010096793 A | 4/2010 |

OTHER PUBLICATIONS

Jul. 2, 2015—(CN)—First Office Action for Appn 201310432586.4 with Eng Tran.

Mar. 22, 2016—International Preliminary Report on Patentability Appn PCTCN2013088689.

* cited by examiner

US 9,500,922 B2

ARRAY SUBSTRATE, LIQUID CRYSTAL DISPLAY PANEL AND DISPLAY DEVICE

CROSS REFERENCE TO RELATED APPLICATIONS

This application is based on International Application No. PCT/CN2013/088689 filed on Dec. 5, 2013, which claims priority to Chinese National Application No. 201310432586.4 filed on Sep. 22, 2013. The entire contents of each and every foregoing application are incorporated herein by reference.

FIELD OF THE ART

Embodiments of the invention relate to the field of display technologies, more particularly, to an array substrate, a liquid crystal display panel and a display device.

BACKGROUND

Thin Film Transistor Liquid Crystal Displays (TFT-LCDs) have the advantages of compact size, low power consumption and radiation free and take a leading role in the current field of flat-panel display technologies. In Plane Switching (IPS) mode LCDs and Advanced Super Dimension Switch (ADS) mode LCDs having the feature of wide viewing angles are gradually becoming the mainstream in the flat-panel display field.

The display quality of a TFT-LCD is an important criterion in determining whether the product is advantageous. Insufficient charging of the pixels is one of the factors causing poor display quality to the TFT-LCD; for example, insufficient charging of the pixels may cause the contrast ratio of the TFT-LCD images to be low and defects such as flickering to of the images. In particular, the resolution of the currently available TFT-LCDs is ever increasing; with such a trend, charging time of each gate line is even shorter so as to maintain the refresh rate of normal images, which will make the problem of insufficient charging of the pixels more common.

Particularly, for the purpose of increasing the viewing angle of the TFT-LCDs, many TFT-LCDs employ the Data Line Reducing technology, which can reduce the number of data lines to a half or even a third of the original number, while doubling or even tripling the number of the gate lines. Therefore, scan speed of each gate line has to be doubled or tripled so as to maintain the refresh rate of the original images, which makes the pick-up time of each gate line reduced to a half or a third of the original. As a result, the phenomenon of insufficient charging of the pixels is even severer. In a word, the problem of LCDs with wide viewing angles having poor display quality caused by insufficient charging of the pixels is serious.

SUMMARY

Embodiments of the invention provide an array substrate, a LCD panel and a display quality, with an aim of improving the display effect of the images.

A first aspect of the invention provides an array substrate, comprising: a substrate, a plurality of pixels disposed on the substrate and defined by a plurality of gate lines and a plurality of data lines; a common electrode and a pixel electrode are disposed in each pixel region, two pixels at adjacent rows in a same column form a pixel set, a first gate line and a second gate line are disposed between the two pixels of the pixel set, and the data line is disposed on a same side of the two pixels; a first switch transistor and a third switch transistor are disposed in one pixel region of the pixel set and at least a second switch transistor is disposed in the other pixel region;

gate electrodes of the first and second switch transistors are respectively connected to the first gate line and the second gate line in a one-to-one correspondence, source electrodes of the first and second switch transistors are both connected to the same data line, and drain electrodes are respectively connected to a pixel electrode in their respective pixel region;

a gate electrode of the third switch transistor is connected to the first gate line, a source electrode of the third switch transistor is connected to a common electrode in the pixel region having the third switch transistor, and a drain electrode of the third switch transistor is connected to a pixel electrode in the pixel region having the second switch transistor.

As an example, the array substrate further comprises a fourth switch transistor disposed in the same pixel region as the second switch transistor; a gate electrode of the fourth switch transistor is connected to the second gate line, a source electrode of the fourth switch transistor is connected to a common electrode in the pixel region having the fourth switch transistor, a drain electrode of the fourth switch transistor is connected to the pixel electrode in the pixel region having the first switch transistor.

As an example, the common electrode is a slit electrode far from the substrate, and the pixel electrode is a plate electrode close to the substrate; or the common electrode is a plate electrode close to the substrate, and the pixel electrode is a slit electrode far from the substrate; or both the common electrode and the pixel electrode are slit electrodes.

As an example, a shape of individual slits in the slit electrode is a straight line, an angle bracket, a parenthesis or a British union jack, and the slits extend along a same direction.

As an example, each of the data lines is shared by two adjacent pixel sets respectively in two columns.

As an example, the source electrodes of the first switch transistor and the second switch transistor are of a U-shaped, the drain electrodes of the first switch transistor and the second switch transistor comprise at least a straight line-shaped first sub-drain electrode, the first sub-drain electrode is disposed in an opening of the corresponding U-shaped source electrode and extends along a direction parallel to tangent lines of two lateral sides of the U-shaped source electrodes.

As an example, the drain electrodes of the first switch transistor and the second switch transistor respectively further comprise a straight line-shaped second sub-drain electrode; the second sub-drain electrode is disposed in the opening of the corresponding U-shaped source electrode and connected to an end of the first sub-drain electrode that is close to the bottom of the U-shaped source electrode; the second sub-drain electrode is perpendicular to the first sub-drain electrode.

As an example, the U-shaped source electrode of the first switch transistor and the U-shaped source electrode of the second switch transistor are electrically connected to each other, the U-shaped source electrode of the first switch transistor or the U-shaped source electrode of the second switch transistor is electrically connected to the data line.

As an example, a bottom of the U-shaped source electrode of the first switch transistor and a bottom of the U-shaped source electrode of the second switch transistor are shared with each other, allowing the U-shaped source electrode of the first switch transistor and the U-shaped source electrode of the second switch transistor to be connected and form an H shape.

As an example, the first gate line and the second gate line are respectively polylines extending along a row direction, a distance between the first gate line and the second gate line in a region corresponding to the first switch transistor and the second switch transistor is larger than a distance between the first gate line and the second gate line in a region corresponding to the third switch transistor and the fourth switch transistor.

As an example, a shape of the first gate line and the second gate line are respectively an S extending along the row direction, and the first gate line and the second gate line are mirror symmetrical to each other.

A second aspect of the invention further provides a LCD panel comprising a color filter substrate and an array substrate assembled together; the array substrate is any one of the above array substrates.

A third aspect of the invention further provides a display device comprising the above LCD panel.

In summary, the array substrate provided by the embodiment of the invention is an array substrate based on the WXGA Dual-Gate configuration. The gate lines and the data lines are disposed as intersecting each other, the plurality of pixels arranged as an array are disposed on the substrate, two pixels at adjacent rows in the same column form a pixel set, a common electrode and a pixel electrode are disposed in each pixel region; a first gate line and a second gate line are disposed between the two pixels of the pixel set, and the data line is disposed on the same side of the two pixels; a first switch transistor and a third switch transistor are disposed in one pixel region of the pixel set and at least a second switch transistor is disposed in the other pixel region. When the pixel at the upper row is being charged, both the first switch transistor T1 and the third switch transistor T3 connected to the first gate line are turned on, and a constant voltage Vcom is applied to the common electrode corresponding to the pixel at the upper row. The constant voltage at the common electrode is applied to the pixel electrode in the pixel region at the lower row through the third switch transistor T3, thereby realizing charging the pixel at the currently scanned row while pre-charging the pixel at the lower row. When the constant voltage Vcom is stored in advance for a pixel, the charging time of the pixel is shortened when charging the pixel at the lower row; or sufficient voltage is charged to the pixel within a short time. In a high resolution LCD, charging sufficient voltage within a short time can help to avoid low contrast ratio of the images and the occurrence of defects such as flickering caused by insufficient charging.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

Figure 1:
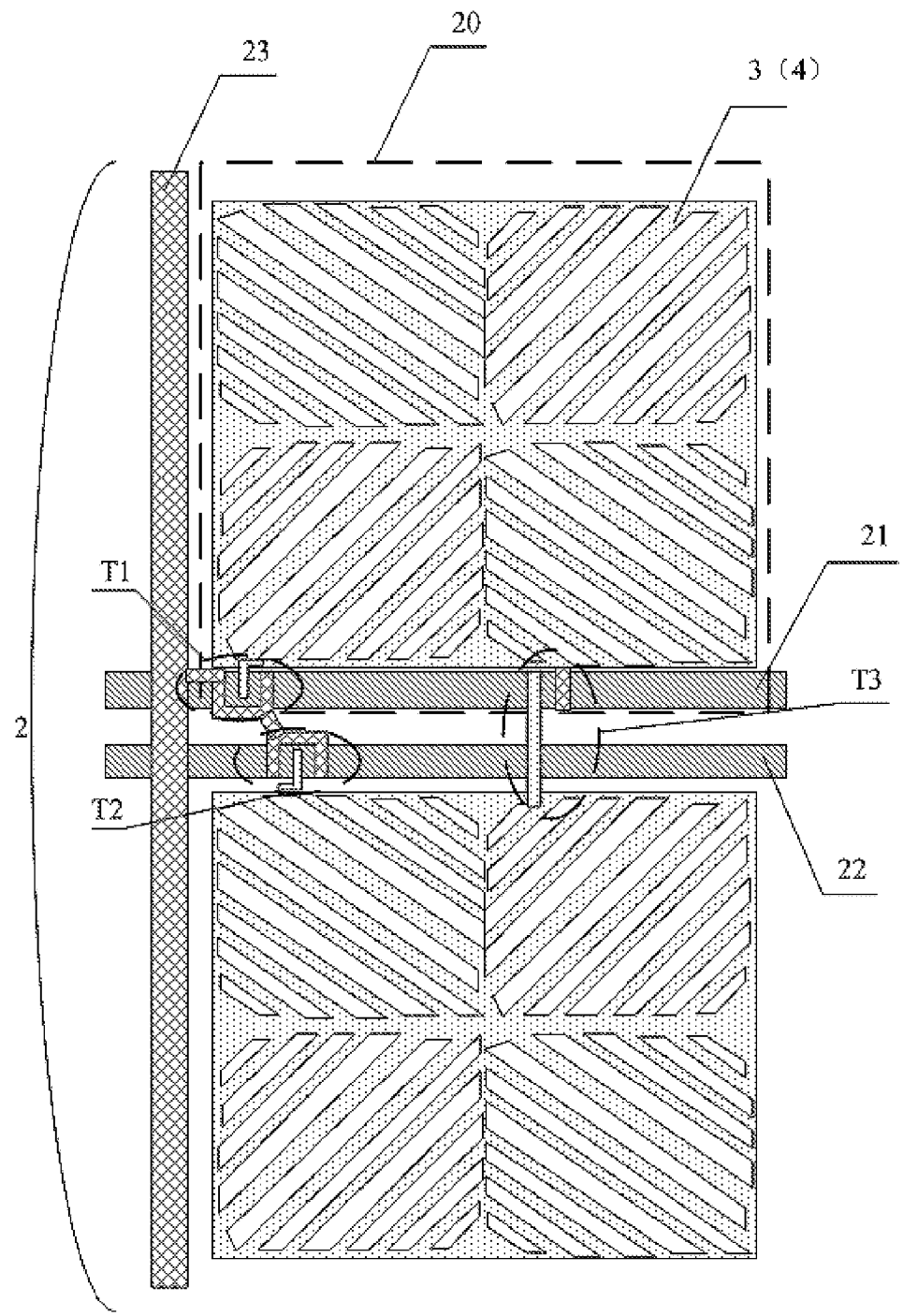
FIG. 1 schematically illustrates a first top view of an array substrate in accordance with an embodiment of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one.

Embodiments of the invention provide an array substrate, a liquid crystal display panel and a display device, with an aim of overcoming low contrast ratio and the defects of flickering caused by insufficient charging of the pixels, thereby improving the image display quality of the liquid crystal display panel.

A liquid crystal display panel provided by an embodiment of the invention comprises a color filter substrate and an array substrate disposed opposed to each other and a liquid crystal layer disposed between the color filter substrate and the array substrate. The liquid crystal display panel is for example an improved ADS mode LCD panel. It is noted that though the following embodiments are described with reference to the ADS mode LCD panel, the disclosure is also applicable to any other form of LCD panels with common electrodes formed on the array substrate, such as an IPS mode LCD panel.

An array substrate provided by an embodiment of the invention is an array substrate based on WXGA Dual-gate configuration (abbreviated as dual-gate configuration). The array substrate comprises: a substrate, gate lines and data lines disposed as intersecting each other, a plurality of pixels disposed on the substrate and arranged as an array. Two pixels at two adjacent rows in a same column form a pixel set. A common electrode and a pixel electrode are disposed in each pixel region. A first gate line and a second gate line are disposed between the two pixels in the pixel set, and the data line is disposed on the same side of the two pixels. Both a first switch transistor and a third switch transistor are disposed in one pixel region of the pixel set, and at least a second switch transistor is disposed in the other pixel region. Gate electrodes of the first and second switch transistors are respectively connected to the first gate line and the second gate line in a one to one correspondence; source electrodes of the first and second switch transistors are both connected to the same data line, and their drain electrodes are respectively connected to the pixel electrode in the respective pixel region. The gate electrode of the third switch transistor is connected to the first gate line, its source electrode is connected to a common electrode in the pixel region having the third switch transistor, and its drain electrode is connected to the pixel electrode in the pixel region having the second switch transistor.

In the following, the array substrate, the LCD panel and the display device provided by the embodiments of the invention will be described in detail with reference to the drawings.

FIG. 1 schematically illustrates a top view of an array substrate having a WXGA Dual-Gate configuration provided by an embodiment of the invention; the array substrate comprises:

a substrate (not shown in FIG. 1);

a plurality of pixels 20 disposed on the substrate and arranged as an array; and a plurality of gate lines and a plurality of data lines disposed as intersecting each other;

two pixels 20 at two adjacent rows in a same column form a pixel set 2; a first gate line 21 (corresponding to a pixel at an upper row) and a second gate line 22 (corresponding to a pixel at a lower row) are disposed between the two pixels 20 in the pixel set 2, the first gate line 21 and the second gate line 22 provide gate scan signals respectively to the upper pixel 20 and the lower pixel 20; and a data line 23 is disposed on the same side of the two pixels in the pixel set 2.

The array substrate further comprises:

a first electrode 3 disposed in each pixel region (the pixel region refers to the region where the pixel 20 locates); and a second electrode 4 stacked with the first electrode 3 and insulated therefrom through an insulation layer (not shown in FIG. 1); the first electrode 3 and the second electrode 4 in FIG. 1 overlap with each other and are indicated by the numeral 3(4); one of the first electrode 3 and the second electrode 4 is a pixel electrode and the other one is a common electrode.

Both a first switch transistor T1 and a third switch transistor T3 are disposed in one of the pixel regions of the pixel set 2; and at least a second switch transistor T2 is disposed in the other pixel region.

Gate electrodes of the first and second switch transistors T1 and T2 are respectively connected to the first gate line 21 and the second gate line 22 in a one to one correspondence; source electrodes of the first and second switch transistors T1 and T2 are both connected to the same data line 23; drain electrodes of the first and second switch transistors T1 and T2 are respectively connected to pixel electrodes in their respective pixel region.

The gate electrode of the third switch transistor T3 is connected to the first gate line 21, its source electrode is connected to the common electrode in the pixel region having the third switch transistor T3, and the drain electrode is connected to the pixel electrode in the pixel region having the second switch transistor T2.

Both the first switch transistor T1 and the third switch transistor T3 being disposed in one of the pixel regions of the pixel set 2 and at least a second switch transistor T2 being disposed in the other pixel region may be implemented in the following ways:

1) the first switch transistor T1 and the third switch transistor T3 are disposed in the pixel region at the upper row, and the second switch transistor T2 is disposed in the pixel region at the lower row;

2) the second switch transistor T2 is disposed in the pixel region at the upper row, and the first switch transistor T1 and the third switch transistor T3 are disposed in the pixel region at the lower row.

As a plurality of pixels are disposed in each row, pixels at the upper and lower rows may form a plurality of pixel sets. As an example, both the first switch transistor T1 and the third switch transistor T3 are disposed in each pixel region on the same row, and a second switch transistor T2 is disposed in each pixel region on another row.

With respect to one pixel set, the above array substrate provided by the embodiment of the invention disposes two switch transistors such as Thin Film Transistors (TFTs) in one pixel region, wherein one TFT is configured to control the charging of the pixel in which the TFT disposed therein when images are displaying, the other TFT is configured to provide a back-feeding voltage for a pixel at the previous scanned row, or provide a pre-charge voltage for a pixel at the next scanned row.

For example, in case that each row of pixels are scanned from top to bottom, when the first switch transistor T1 and the third switch transistor T3 are disposed in the pixel region of the pixel set at the upper row, the second switch transistor T2 is disposed in the lower pixel region at the lower row. The gate electrodes of the first switch transistor T1 and the third switch transistor T3 are connected to the first gate line, the source electrode of the third switch transistor T3 is connected to the common electrode in the pixel region at the upper row, and the drain electrode of the third switch transistor T3 is connected to the pixel electrode in the pixel region at the lower row. When the pixel at the upper row is being charged, the first switch transistor T1 and the third switch transistor T3 connected to the first gate line are both turned on, and a constant voltage Vcom is applied to the common electrode in the pixel at the upper row. The constant voltage on the common electrode is applied to the pixel electrode in the pixel region at the lower row through the third switch transistor T3, thereby realizing pre-charging the pixel at the lower row while charging the pixel at the currently scanned row. As the pixel at the lower row is charged simultaneously while storing the constant voltage Vcom for one pixel, the charging time for the pixel is shortened, thereby providing sufficient voltage for the pixel in a shorter time. In a high resolution LCD, the defects of low contrast ratio and flickering of images caused by insufficient charging is avoided by charging to a sufficient voltage within a shorter time With respect to a whole row of pixels, when the first switch transistors T1 and the third switch transistors T3 are disposed in each pixel region at the upper row, each pixel at the lower row is pre-charged simultaneously while the scanned pixels at the upper row are being charged. Alternatively, when first switch transistors T1 and third switch transistors T3 are disposed in each pixel region at the lower row, a voltage is simultaneously fed back to each pixel at the upper row when the scanned pixels at the lower row are being charged.

Especially in case that the TFT-LCDs adopts the Data Line Reducing technology and the scan speed of the gate line is fast, the pixels at the lower row which are not turned on can be pre-charged, and the pixels at the upper row which are already in discharge state can be charged again, thereby guaranteeing that each pixel is sufficiently charged and discharged, improving the contrast ratio of the images and reducing the possibility of defects such as flickering, improving the display effect of the images.

Figure 2:
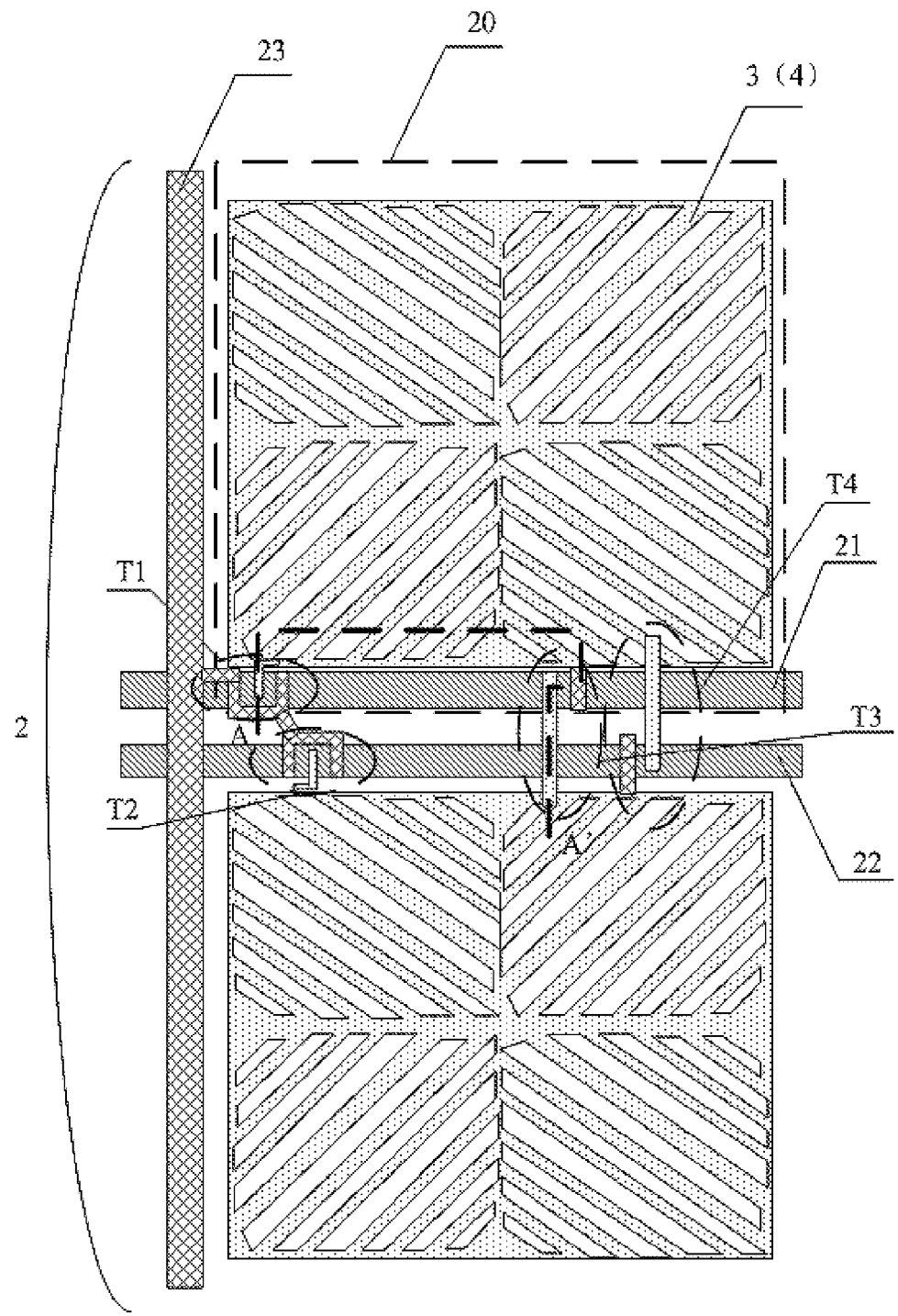
FIG. 2 schematically illustrates a second top view of an array substrate in accordance with an embodiment of the invention.

To further increase the contrast ratio of the images and reduce the possibility of defects such as flickering, with reference to FIG. 2, another embodiment of the invention provides an array substrate which comprises a fourth switch transistor T4 disposed in the pixel region having the second switch transistor T2. The gate electrode of the fourth switch transistor T4 is connected to the second gate line 22, its source electrode is connected to the common electrode in the pixel region having the fourth switch transistor T4, and its drain electrode is connected to the pixel electrode in the pixel region having the first switch transistor T1.

That is to say, in each pixel set, the pixel at the upper row has two TFTs disposed in its pixel region, and the pixel at the lower row has two TFTs disposed in its pixel region.

In each pixel set, one of the two TFTs in each pixel region is connected to the gate line, the data line and the pixel electrode corresponding to the pixel having the TFT. The other TFT is connected to the gate line and the common electrode corresponding to the pixel having the TFT and further connected to the pixel electrode in the other pixel region.

In each pixel set, when the pixel at the upper row is being charged, the pixel at the lower row to be scanned is pre-charged at the same time, the charged value is the voltage Vcom on the common electrode. When the pixel at the lower row to be scanned is being charged, a voltage is fed back to the pixel at the previous scanned row (actually it is being re-charged), the charged value is the voltage Vcom on the common electrode.

Figure 3:
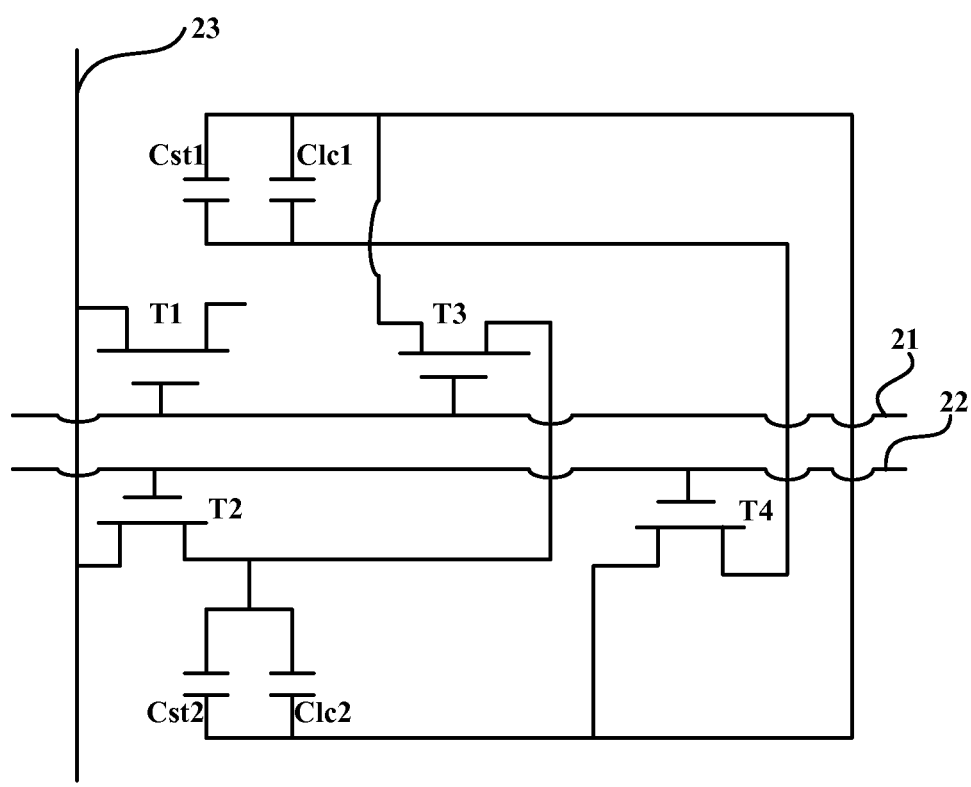
FIG. 3 is an equivalent circuit of a pixel configuration on the array substrate illustrated in FIG. 2.

To further illustrate the two switch transistors for pre-charging and/or compensating the voltage disposed in the pixel region of the array substrate provided by the embodiment of the invention, FIG. 3 illustrates an equivalent circuit of a pixel structure on the array substrate illustrated in FIG. 2;

It is assumed in FIG. 3 that the pixel at the upper row is a first pixel and the pixel at the lower row is a second pixel.

As illustrated in FIG. 3, Cst1 is the storage capacitor of the first pixel, Clc1 is the liquid crystal capacitor (Cst and Clc being the same capacitor for the ADS mode and the IPS mode LCD panels) of the first pixel, the storage capacitor is generated by the pixel electrode and the common electrode insulated from each other. Cst2 is the storage capacitor of the second pixel and the Clc2 is the liquid crystal capacitor of the second pixel.

The third switch transistor T3 is connected to Clc1 and Cst2, the third switch transistor T3 is configured for transferring the voltage signal on the common electrode in the pixel region at the previous scanned row to the pixel electrode in the pixel region at the following scanned row for pre-charging. The fourth switch transistor T4 is configured for transferring the voltage signal at the common electrode in the pixel region at the following scanned row to the pixel electrode in the pixel region at the previous scanned row for charges compensation (that is voltage feedback).

The working principle of the pixel configuration illustrated in FIG. 3 is as follows:

When the first gate line 21 is of a high level and the second gate line 22 is of a low level, the first switch transistor T1 is turned on and the second switch transistor T2 is turned off. The signal at the data line 23 charges the pixel electrode in the first pixel region (the region where the first pixel locates) through the first switch transistor T1 and applies a constant voltage Vcom to the common electrode in the first pixel region. As a result, a horizontal electric field is formed between the pixel electrode and the common electrode in the first pixel region, thereby driving liquid crystal molecules located above the common electrode in the first pixel region to rotate.

The third switch transistor T3 is also turned on as the voltage is applied to the first gate line 21. The source electrode of the third switch transistor T3 transfers the electric signal on the common electrode in the first pixel region by way of a via hole to the pixel electrode in the second pixel region. That is to say, the second pixel is pre-charged for once through the charging procedure of the first pixel before the second pixel is stated up.

When the first gate line 21 is of a low level and the second gate line 22 is of a high level, the first switch transistor T1 is turned off and the second switch transistor T2 is turned on. The signal on the data line 23 charges the pixel electrode in the second pixel region (the region where the second pixel locates) through the second switch transistor T2, and applies the constant voltage Vcom to the common electrode in the second pixel region at the same time. As a result, a horizontal electric field is formed between the pixel electrode and the common electrode in the second pixel region, thereby driving liquid crystal molecules located above the common electrode in the second pixel region to rotate.

The fourth switch transistor T4 is also turned on as the voltage is applied to the second gate line 22. The source electrode of the fourth switch transistor T4 transfers the electric signal on the common electrode in the second pixel region by way of a via hole to the pixel electrode in the first pixel region. That is, a charge compensation is provided for the pixel electrode in the first pixel region which is in discharging state, allowing the charges on the pixel electrode, when the first pixel is in discharging state, not to decrease too much due to current leakage and the like.

The pixel electrode and the common electrode provided by the embodiment of the invention are transparent conductive electrode, such as ITO or IZO and the like.

In all of the above embodiments, the pixel electrode and the common electrode may be laminated in a stack, the pixel electrode may be disposed above the common electrode (that is, the pixel electrode is further away from the substrate than the common electrode), or below the common electrode (that is, the pixel electrode is closer to the substrate than the common electrode).

The pixel electrode and the common electrode may be plate electrodes (with no hollowed-out patterns) or slit electrodes.

To improve the aperture ratio of each pixel, as an example, the common electrode or the pixel electrode which is further away from the substrate is a slit electrode, the pixel electrode or common electrode which is closer to the substrate is a plate electrode. Alternatively, both the pixel electrode and the common electrode are slit electrodes.

As an example, a shape of individual slits in the slit electrode is a straight line, an angle bracket < >, a parenthesis ( ), or a British union jack (like Chinese character "米"), and the slits are extending along the same direction.

The slits in the first electrode 3 and the slits in the second electrode 4 as illustrated in FIGS. 1 and 2 all have a British union jack shape. A British union jack-shaped slit electrode allows liquid crystal molecules to present a multi-domain distribution, thereby increasing the viewing angle of the LCD panel. The angle bracket- and parentheses-shaped slit electrodes allow the liquid crystal molecules to present at least a dual-domain distribution. In detailed implementations, the shape of the slit in the first or second electrode may be configured as required.

Generally, the larger the ratio between the channel width W and length L of a switch transistor (such as a TFT) is, the larger the turn-on current Ion of the switch transistor is, thus, the pixel is charged more sufficiently. In the following embodiments of the invention, for the purpose of further solving the problem of insufficient charging of the pixels, the turn-on current of the switch transistor is increased by configuring the shape of the first and second switch transistors T1 and T2 for charging the pixels which have the transistors T1 and T2. As an example, the source electrodes of both the first switch transistor T1 and the second switch transistor T2 have a U-shape, the drain electrodes of both the first switch transistor T1 and the second switch transistor T2 respectively comprise at least a first sub-drain electrode in the shape of straight line, and the first sub-drain electrode is disposed in the opening of the corresponding U-shaped source electrode and along a direction parallel to the tangent lines of the two lateral sides of the U-shaped source electrode.

Figure 4:
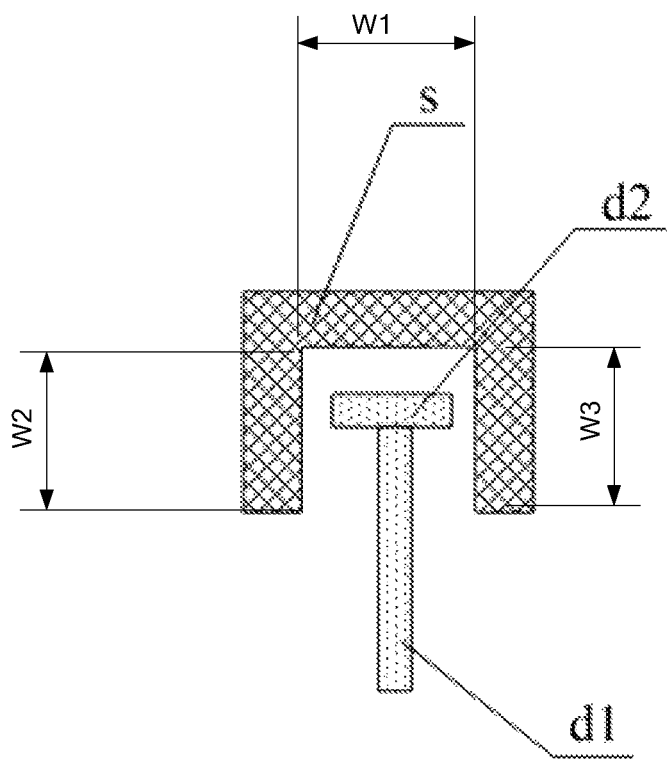
FIG. 4 schematically illustrates an enlarged configuration of a first switch transistor or a second switch transistor in accordance with an embodiment of the invention.

FIG. 4 schematically illustrates an enlarged view of the first switch transistor T1 or the second switch transistor T2. The switch transistor illustrated in FIG. 4 comprises only a source electrode and a drain electrode. The source electrode s is U-shaped, the drain electrode comprises at least a straight line-shaped first sub-drain electrode d1, the first sub-drain electrode d1 is disposed in the opening the corresponding U-shaped source electrode s and extends along the vertical direction, that is, parallel to the two lateral sides of the U-shaped source electrode.

It is seen from FIG. 4 that the directly facing area between the source electrode s and the first sub-drain electrode d1 is relatively large. The width W of the channel is approximately equal to the length of the curve of the U-shaped source electrode (i.e., W=W1+W2+W3). The length L of the channel is approximately equal to the average distance between the U-shaped source electrode s and the first sub-drain electrode d1 (i.e., L=(L1+L2+L3)/3). The U-shaped source electrode and the straight line-shaped first sub-drain electrode compactly conform to each other, and the parasitic capacitor therebetween is relatively small. Moreover, the ratio of the channel width W and the length L is relatively large, making the turn-on current ion of the switch transistor larger.

To overcome the inconvenience in repairing the first switch transistor T1 and the second switch transistor T2 in case they get damaged, as an example, the drain electrodes of the first switch transistor T1 and the second switch transistor T2 respectively further comprise a second sub-drain electrode in the shape of straight line. The second sub-drain electrode is disposed in the opening of the corresponding U-shaped source electrode and connected to an end of the first sub-drain electrode that is close to the bottom of the U-shaped source electrode; the second sub-drain electrode is perpendicular to the first sub-drain electrode.

With reference to FIG. 4, the above switch transistor may further comprise a straight-line shaped second sub-drain electrode d2, the second sub-drain electrode d2 is disposed in the opening of the corresponding U-shaped source electrode s and connected to an end of the first sub-drain electrode d1 that is close to the bottom of the U-shaped source electrode; the second sub-drain electrode d2 is perpendicular to the first sub-drain electrode d1.

The disposition of the second sub-drain electrode d2 can facilitate the repairing of the first switch transistor T1 and the second switch transistor T2 in case they get damaged. For example, when a part of the U-shaped source electrode s is electrically connected to a part of the second sub-drain electrode d2 via an electric conductive foreign matter, the electric conductive foreign matter along with the parts of the source electrode s and the second sub-drain electrode d2 connected to the electric conductive foreign matter will be cut away together, while the rest of the source electrode and the second sub-drain electrode are kept. As the remaining part of the source electrode and the second sub-drain electrode are insulated from each other, the repaired switch transistor can still function normally.

The first switch transistor T1 and the second switch transistor T2 provided by the embodiment of the invention can be any switch transistor with a large charging capacity and a small parasitic capacitor.

With reference to FIG. 1, in the array substrate provided by the embodiment of the invention, the source electrodes of the first and second switch transistors T1 and T2 are U-shaped. For the convenience of wiring arrangement, the opening of the source electrode of the first switch transistor T1 faces the pixel electrode in the pixel region having the first switch transistor T1, and the opening of the source electrode of the second switch transistor T2 faces the pixel electrode in the pixel region having the second switch transistor T2.

Furthermore, as illustrated in FIG. 1, based on the disposition of the above first and second switch transistors T1 and T2, the source electrodes of the first switch transistor T1 and the second switch transistor T2 in respective pixels at the same column and of the same pixel set are connected to each other, and the source electrodes of the first switch transistor T1 and the second switch transistor T2 which is closer to the data line is connected to the data line, thereby avoiding complicated wiring and simplifying the circuit layout.

The U-shaped source electrode of the first switch transistor and the U-shaped source electrode of the second switch transistor may be connected in any way, as long as the two are electrically connected to each other.

As an example, the bottom of the U-shaped source electrode of the first switch transistor and the bottom of the U-shaped source electrode of the second switch transistor are connected to each other. In other examples, the two may be connected by other wires or be directly connected to each other.

Figure 5:
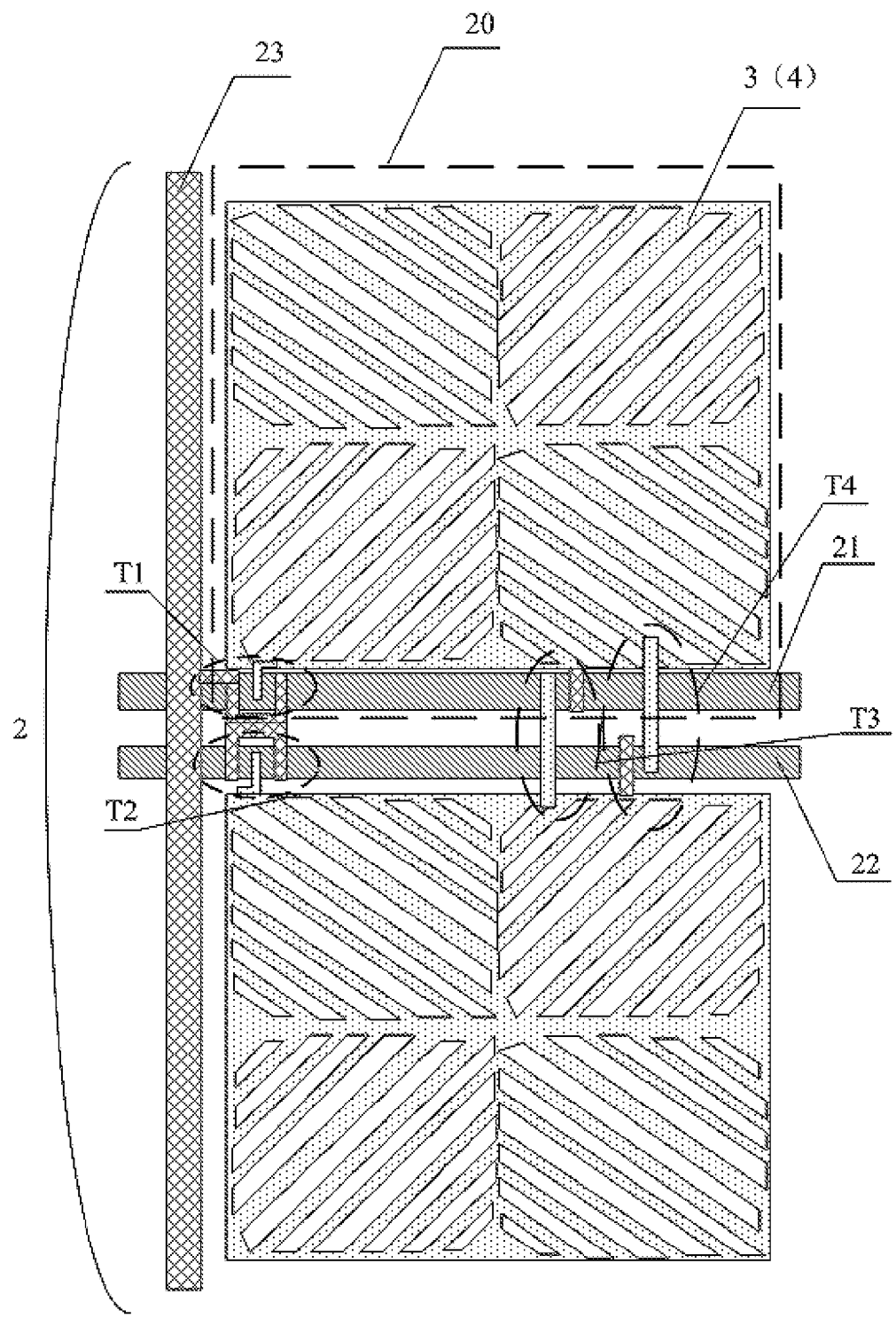
FIG. 5 schematically illustrates a third top view of an array substrate in accordance with an embodiment of the invention.

With reference to FIG. 5, the first switch transistor and the second switch transistor share the bottom of the U-shaped source electrode, allowing the U-shaped source electrode of the first switch transistor and the U-shaped source electrode of the second switch transistor to be connected and form an H shape.

With reference to FIG. 1, to increase the contact area between each of drain electrodes of the first switch transistor T1 and the second switch transistor T2 and the pixel electrode and to increase the firmness between the drain electrode and the pixel electrode, both the first sub-drain electrode of the first switch transistor T1 and the first sub-drain electrode of the second switch transistor T2 have a L shape, and a short side of the L located on a side far from the U-shaped opening.

With reference to FIG. 2, both the source electrodes and the drain electrodes of the third switch transistor T3 and the fourth switch transistor T4 have a straight line shape. Both areas of the third switch transistor T3 and the fourth switch transistor T4 is small, while the first switch transistor T1 and the second switch transistor T2 each comprising the U-shaped source electrode has a relatively large area.

Figure 6:
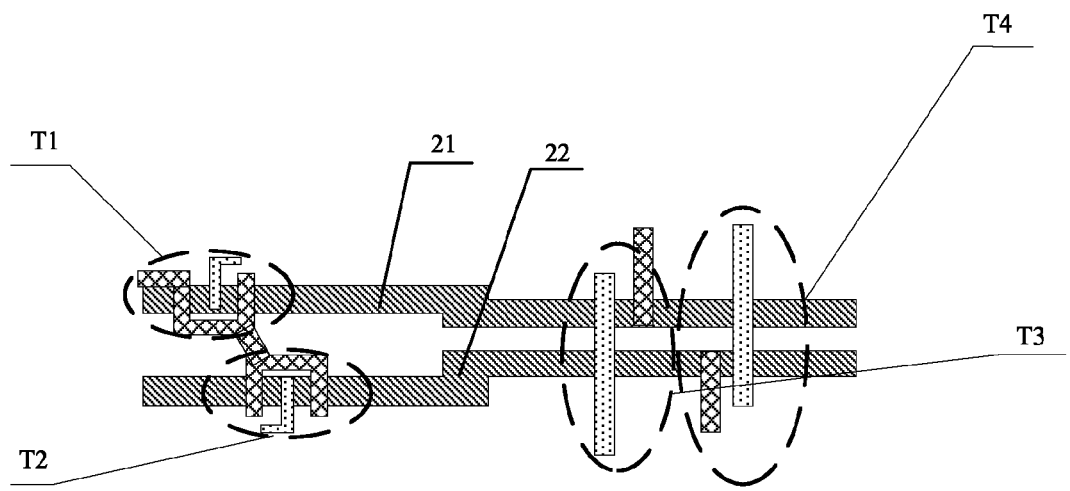
FIG. 6 schematically illustrates a configuration of a gate line in accordance with an embodiment of the invention.

To increase the aperture ratio of the pixel to a maximum extent, a gate line provided by still another embodiment of the invention is a polyline. With reference to FIG. 6, the first gate line 21 and the second gate line 22 are respectively polylines extending along the row direction (that is, the horizontal direction). A distance between the first gate line 21 and the second gate line 22 in a region corresponding to the first switch transistor T1 and the second switch transistor T3 is larger than a distance between the first gate line 21 and the second gate line 22 in a region corresponding to the third switch transistor T3 and the fourth switch transistor T4.

As an example, the pixel set in each column is electrically connected to one data line, so the pixel sets in all columns are electrically connected to a plurality of data lines in a one to one correspondence.

To increase the scan speed of the pixel and the refresh rate of the pixel, each data line is shared by two adjacent columns of pixels, that is, two adjacent columns of pixels are connected to the same and one data line.

With reference to FIG. 6, the shape of the first gate line 21 and the second gate line 22 are respectively air S extending along the row direction, and the first gate line 21 and the second gate line 22 are mirror symmetrical to each other, so as to guarantee the distance between the first gate line 21 and the second gate line 22 in the region corresponding to the first switch transistor T1 and the second switch transistor T3 is larger than the distance between the first gate line 21 and the second gate line 22 in the region corresponding to the third switch transistor T3 and the fourth switch transistor T4.

Alternatively, the first switch transistor T1 and the second switch transistor T2 may be formed as partially overlapping with each other. For example, the first switch transistor T1 and the second switch transistor T2 as a whole form a "H", the upper part being the source electrode of the first switch transistor T1 and the lower part being the source electrode of the second switch transistor T2, as illustrated in FIG. 5

As an example, the first switch transistor and the second switch transistor have totally the same configuration and are symmetrical to each other in the pixel region; the third switch transistor T3 and the fourth switch transistor T4 have totally the same configuration and are symmetrical to each other in the pixel region.

The source electrode and the drain electrode of the third switch transistor or the fourth switch transistor are in the same layer, the source electrode is connected to the common electrode and the drain electrode is connected to the pixel electrode, therefore, the common electrodes in each pixel region of the embodiment of the invention are in the same layer, and the pixel electrodes in each pixel region are in the same layer. When the common electrode and the source electrode are not in the same layer, they are connected by way of a via hole; or when the pixel electrode and the drain electrode are not in the same layer, they are connected by way of a via hole.

Figure 7:
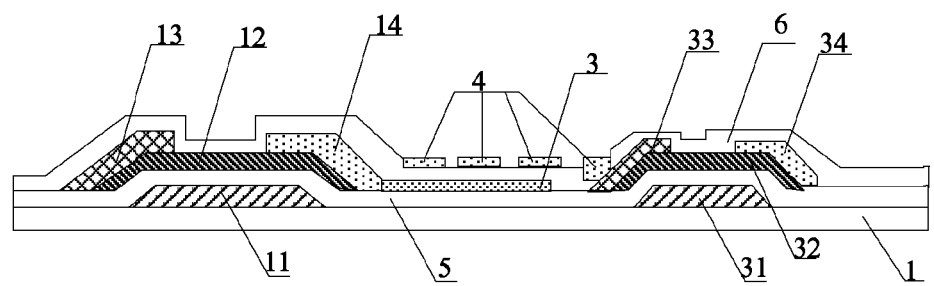
FIG. 7 is a cross section view taken along A-A' of the array substrate illustrated in FIG. 2.

To clearly describe the individual film layer configuration of the array substrate provided by FIGS. 1 and 2 of the embodiment of the invention, with reference to FIG. 7, in which a cross section taken along A-A' of the array substrate shown in FIG. 2 is illustrated, and the individual functional film layers of the first switch transistor and the third switch transistor are shown. The array substrate comprises:

a substrate 1;

a first gate electrode 11 and a third gate electrode 31 disposed in the same layer on the substrate 1;

a gate insulating layer 5 disposed on the first gate electrode 11 and the third electrode 31;

a first semiconductor layer 12 and a third semiconductor layer 32 disposed in the same layer and on the gate insulating layer 5;

a first source electrode 13, a first drain electrode 14 and a third source electrode 33 as well as a third drain electrode 34 respectively disposed on the first semiconductor layer 12 and the third semiconductor 32, and a first pixel electrode 3 connected to the first drain electrode 14;

a passivation layer 6 disposed on the first source electrode 13, the first drain electrode 14, a first pixel electrode 3, the third source electrode 33 and the third drain electrode 34; a via hole is disposed in a region of the passivation layer 6 which corresponds to the third source electrode 33.

The array substrate further comprises: a first common electrode 4 disposed on the passivation layer 6; the first common electrode 4 is a slit electrode, and is connected to the third source electrode 33 by way of the via hole.

Herein, the first gate electrode 11, the gate insulating layer 5, the first semiconductor layer 12, the first source electrode 13, and the first drain electrode 14 are the film layers of the first switch transistor, and the first common electrode 4 and the first pixel electrode 3 are the electrode structures in the pixel region of the first switch transistor.

The third gate electrode 31, the gate insulating layer 5, the third semiconductor layer 32, the third source electrode 33 and the third drain electrode 34 are the film layers of the third switch transistor; the first common electrode 4 is connected to the third source electrode 33.

It is noted that the common electrode is disposed in each pixel region and common electrodes in individual pixel regions are electrically connected to each other. Furthermore, though the above embodiments are described with reference to examples where the common electrode is the slit electrode formed at an upper position and the pixel electrode is the plate electrode formed at a lower position, those skilled in the art will understand that the common electrode may be formed at a lower position and the pixel electrode may be formed at an upper position, as long as the one in the upper position is the slit electrode, and the one in the lower position is the plate electrode. Alternatively, in the IPS mode display panel, both the pixel electrode and the common electrode may be slit electrode formed in the same layer or formed in different layers, as long as the above connection relationship is satisfied. That is, the first common electrode is connected to the second common electrode, the source electrode of the third switch transistor and the source electrode of the fourth switch transistor, whereas the first pixel electrode is connected to the drain electrodes of the first and fourth switch transistors, and the second pixel electrode is connected to the drain electrodes of the second and third switch transistors. Here, the slit electrode is for example in the shape of comb-like, or a plate electrode having slits carved thereon.

The procedure for fabricating the array substrate is similar to that for fabricating a known array substrate, and it only needs a mask for forming elements having the above connection relationship, which will not be elaborated here.

An embodiment of the invention further provides a LCD panel, which comprises the above array substrate provided by the embodiment of the invention. As an example, the LCD panel may further comprise a color filter substrate, the color filter substrate is a known one which can at least realize the ADS mode LCD panel when combining with the array substrate.

An embodiment of the invention provides a display device, comprising the above LCD panel; the display device may be a liquid crystal panel, a liquid crystal display or a liquid crystal television.

The array substrate provided by the embodiment of the invention is an array substrate based on dual-gate configuration. An implementation of the dual-gate array substrate is illustrated in FIG. 8.

Figure 8:
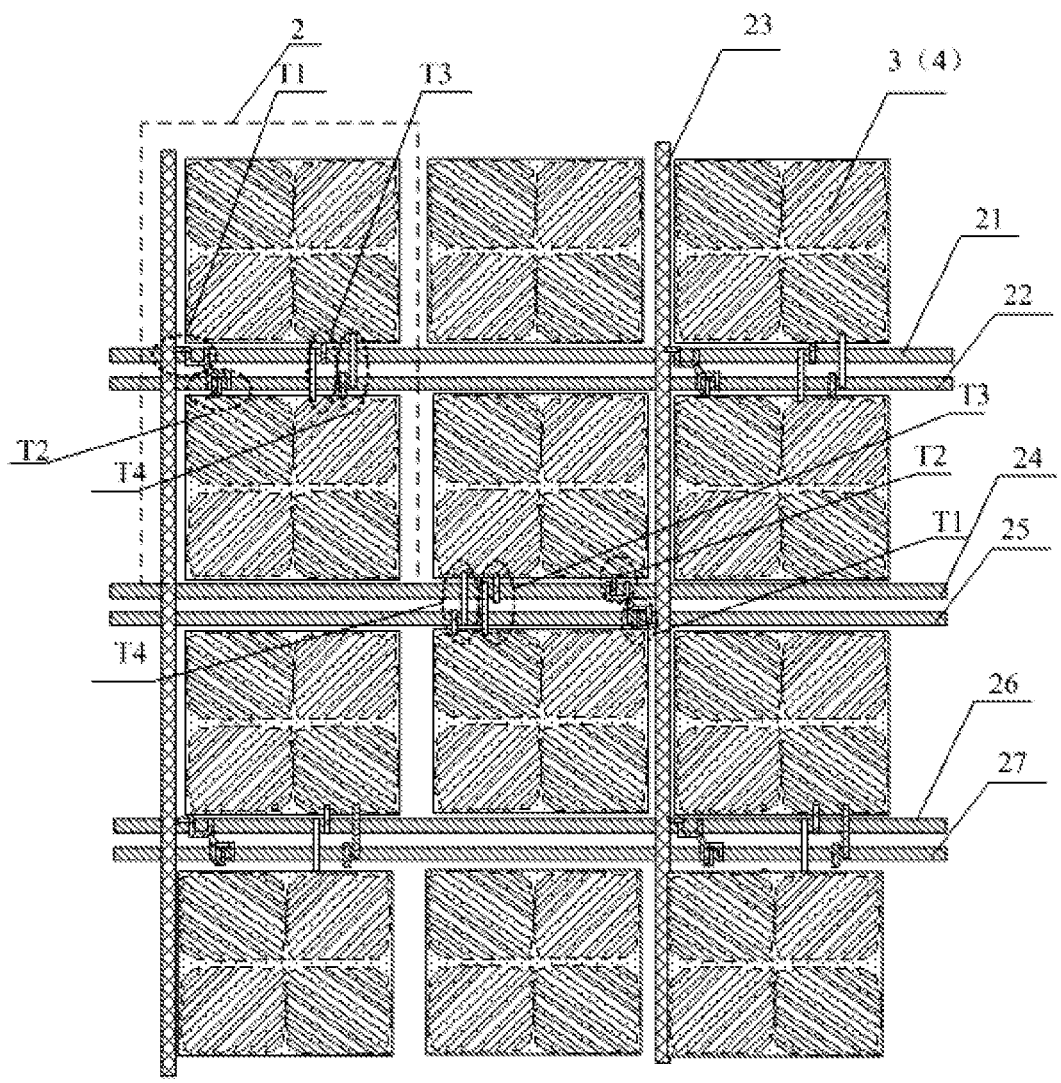
FIG. 8 schematically illustrates a configuration of a dual-gate array substrate in accordance with an embodiment of the invention.

The array substrate illustrated in FIG. 8 comprises four rows of pixels. Two gate lines are disposed between any two adjacent rows of pixels, and there are six gate lines in total from top to the bottom, which are respectively a first gate line 21 and a second gate line 22 between the first and second rows of pixels, a third gate line 24 and a fourth gate line 25 between the second and third rows of pixels and a fifth gate line 26 and a sixth gate line 27 between the third and fourth rows of pixels.

With respect to one pixel set 2, a first switch transistor T1 and a third switch transistor T3 are disposed in a first pixel region (the region where the first pixel locates); gate electrodes of the first switch transistor T1 and the third switch transistor T3 are connected to the first gate line 21; a second switch transistor T2 and a fourth switch transistor T4 are disposed in the second pixel region; gate electrodes of the second switch transistor T2 and the fourth switch transistor T4 are connected to the second gate line 22.

With respect to one column of pixels, two adjacent pixels form a pixel set. When one column of pixels comprises 2n pixels, there are totally n pixel sets. With respect one row of pixels, one of two adjacent pixels forms a pixel set with a pixel at a previous (or a following) row in the same column, and the other pixel forms a pixel set with the pixel at the following (or the previous) row in the same column.

FIG. 8 is just an example of the dual-gate array substrate and the dual-gate configuration is not limited to the configuration illustrated in FIG. 8, which will not be elaborated here.

In summary, in the array substrate provided by the embodiments of the invention, pixels at two adjacent rows form a pixel set; each pixel comprises a common electrode and a pixel electrode disposed in different layers; a first gate line and a second gate line are disposed between the pixel at the upper row and the pixel at the lower row in the same pixel set, a data line is disposed between two adjacent columns of pixels; each pixel at the upper row of the pixel set comprises a first switch transistor and a third switch transistor, and each pixel at the lower row comprises at least a second switch transistor; the first switch transistor and the second switch transistor are configured as being turned on when their own pixel needs to be charged, so that their pixels can be charged; the third switch transistor is turned on when the first switch transistor is turned on, to pre-charge the pixel at the lower row. The pixel at the lower row is pre-charged when it is not turned on, such that the voltage difference during charging and discharging procedure is reduced when the pixel at the lower row is charged, the time both for charging and discharging the pixel is shorten, and the display effect of the images is improved.

What are described above is related to the illustrative embodiments of the disclosure only and not limitative to the scope of the disclosure; the scopes of the disclosure are defined by the accompanying claims.

What is claimed is:

1. An array substrate, comprising:
a substrate;
a plurality of pixel regions disposed on the substrate and defined by a plurality of gate lines and a plurality of data lines; and
a common electrode and a pixel electrode disposed in each of the plurality of pixel regions, two pixel regions at adjacent rows in a same column form a pixel set, a first gate line and a second gate line are disposed between the two pixel regions of the pixel set, and the data line is disposed on a same side of the two pixel regions,
wherein a first switch transistor and a third switch transistor are disposed in one pixel region of the pixel set and at least a second switch transistor is disposed in another pixel region,
wherein gate electrodes of the first and second switch transistors are respectively connected to the first gate line and the second gate line, source electrodes of the first and second switch transistors are both connected to a same data line, and drain electrodes of the first and second switch transistors are respectively connected to a pixel electrode in their respective pixel region, and
wherein a gate electrode of the third switch transistor is connected to the first gate line, a source electrode of the third switch transistor is connected to a common electrode in the pixel region having the third switch transistor, and a drain electrode of the third switch transistor is connected to a pixel electrode in the pixel region having the second switch transistor.

2. The array substrate of claim 1, further comprising a fourth switch transistor disposed in a same pixel region as the second switch transistor,
wherein a gate electrode of the fourth switch transistor is connected to the second gate line, a source electrode of the fourth switch transistor is connected to a common electrode in the pixel region having the fourth switch transistor, and a drain electrode of the fourth switch transistor is connected to the pixel electrode in the pixel region having the first switch transistor.

3. The array substrate of claim 1, wherein the common electrode is a slit electrode far from the substrate, the pixel electrode is a plate electrode close to the substrate; or
the common electrode is a plate electrode close to the substrate, and the pixel electrode is a slit electrode far from the substrate; or
both the common electrode and the pixel electrode are slit electrodes.

4. The array substrate of claim 3, wherein a shape of individual slit in the slit electrode is a straight line, an angle bracket, a parenthesis or a British union jack, and the slit extends along a same direction.

5. The array substrate of claim 1, wherein each of the data lines is shared by two adjacent pixel sets respectively in two columns.

6. The array substrate of claim 1, wherein the source electrodes of the first switch transistor and the second switch transistor are U-shaped, the drain electrodes of the first switch transistor and the second switch transistor comprise at least a straight line-shaped first sub-drain electrode, and the first sub-drain electrode is disposed in an opening of a corresponding U-shaped source electrode and extends along a direction parallel to tangent lines of two lateral sides of the U-shaped source electrodes.

7. The array substrate of claim 6, wherein the drain electrodes of the first switch transistor and the second switch transistor further comprise a straight line-shaped second sub-drain electrode, the second sub-drain electrode is disposed in the opening of the corresponding U-shaped source electrode and connected to an end of the first sub-drain electrode that is close to a bottom of the U-shaped source electrode, and the second sub-drain electrode is perpendicular to the first sub-drain electrode.

8. The array substrate of claim 7, wherein the U-shaped source electrode of the first switch transistor and the U-shaped source electrode of the second switch transistor are electrically connected to each other, and the U-shaped source electrode of the first switch transistor or the U-shaped source electrode of the second switch transistor is electrically connected to the data line.

9. The array substrate of claim 8, wherein a bottom of the U-shaped source electrode of the first switch transistor and a bottom of the U-shaped source electrode of the second switch transistor are shared with each other, allowing the U-shaped source electrode of the first switch transistor and the U-shaped source electrode of the second switch transistor to be connected and form an H shape.

10. The array substrate of claim 2, wherein the first gate line and the second gate line are respectively polylines extending along a row direction, and a distance between the first gate line and the second gate line in a region corresponding to the first switch transistor and the second switch transistor is larger than a distance between the first gate line and the second gate line in a region corresponding to the third switch transistor and the fourth switch transistor.

11. The array substrate of claim 10, wherein shapes of the first gate line and the second gate line are respectively an S extending along the row direction, and the first gate line and the second gate line are mirror symmetrical to each other.

12. A LCD panel comprising the array substrate of claim 1.

13. A display device comprising the LCD panel of claim 12.

14. The array substrate of claim 2, wherein the common electrode is a slit electrode far from the substrate, the pixel electrode is a plate electrode close to the substrate, or the common electrode is a plate electrode close to the substrate, and the pixel electrode is a slit electrode far from the substrate, or both the common electrode and the pixel electrode are slit electrodes.

15. The array substrate of claim 2, wherein each of the data lines is shared by two adjacent pixel sets respectively in two columns.

16. The array substrate of claim 3, wherein each of the data lines is shared by two adjacent pixel sets respectively in two columns.

17. The array substrate of claim 4, wherein each of the data lines is shared by two adjacent pixel sets respectively in two columns.

18. The array substrate of claim 2, wherein the source electrodes of the first switch transistor and the second switch transistor are U-shaped, the drain electrodes of the first switch transistor and the second switch transistor comprise at least a straight line-shaped first sub-drain electrode, and the first sub-drain electrode is disposed in an opening of a corresponding U-shaped source electrode and extends along a direction parallel to tangent lines of two lateral sides of the U-shaped source electrodes.

19. The array substrate of claim 3, wherein the source electrodes of the first switch transistor and the second switch transistor are U-shaped, the drain electrodes of the first switch transistor and the second switch transistor comprise at least a straight line-shaped first sub-drain electrode, and the first sub-drain electrode is disposed in an opening of the corresponding U-shaped source electrode and extends along a direction parallel to tangent lines of two lateral sides of the U-shaped source electrodes.

20. The array substrate of claim 4, wherein the source electrodes of the first switch transistor and the second switch transistor are U-shaped, the drain electrodes of the first switch transistor and the second switch transistor comprise at least a straight line-shaped first sub-drain electrode, and the first sub-drain electrode is disposed in an opening of the corresponding U-shaped source electrode and extends along a direction parallel to tangent lines of two lateral sides of the U-shaped source electrodes.

* * * * *